J. WARD.
CONSTANT MESH CHANGE SPEED GEAR.
APPLICATION FILED DEC. 20, 1918.

1,333,952.

Patented Mar. 16, 1920.
3 SHEETS—SHEET 1.

Inventor:-
John Ward
By his Attorney:- Walter Gunn

J. WARD.
CONSTANT MESH CHANGE SPEED GEAR.
APPLICATION FILED DEC. 20, 1918.

1,333,952.

Patented Mar. 16, 1920.

Inventor:-
John Ward
By his Attorney:- Walter Gunn

UNITED STATES PATENT OFFICE.

JOHN WARD, OF BLACKBURN, ENGLAND.

CONSTANT-MESH CHANGE-SPEED GEAR.

1,333,952.     Specification of Letters Patent.     Patented Mar. 16, 1920.

Application filed December 20, 1918. Serial No. 267,641.

*To all whom it may concern:*

Be it known that I, JOHN WARD, a subject of the King of Great Britain and Ireland, and resident of Blackburn, England, have invented certain new and useful Improvements in Constant-Mesh Change-Speed Gear, of which the following is a specification.

This invention refers to what is known as constant mesh change speed gear for use chiefly with motor road vehicles. Heretofore, such gear has usually consisted of epicyclic spur gearing only, occupying a comparatively large space.

According to the present invention, the gear consists essentially of a combination of epicyclic spur gearing and epicyclic bevel gearing so compounded as to give, inclusive of a direct drive, three forward speeds and also a reverse speed preferably equal to that on the lowest forward speed, said gearing as a whole lying in small compass.

Figure 1:
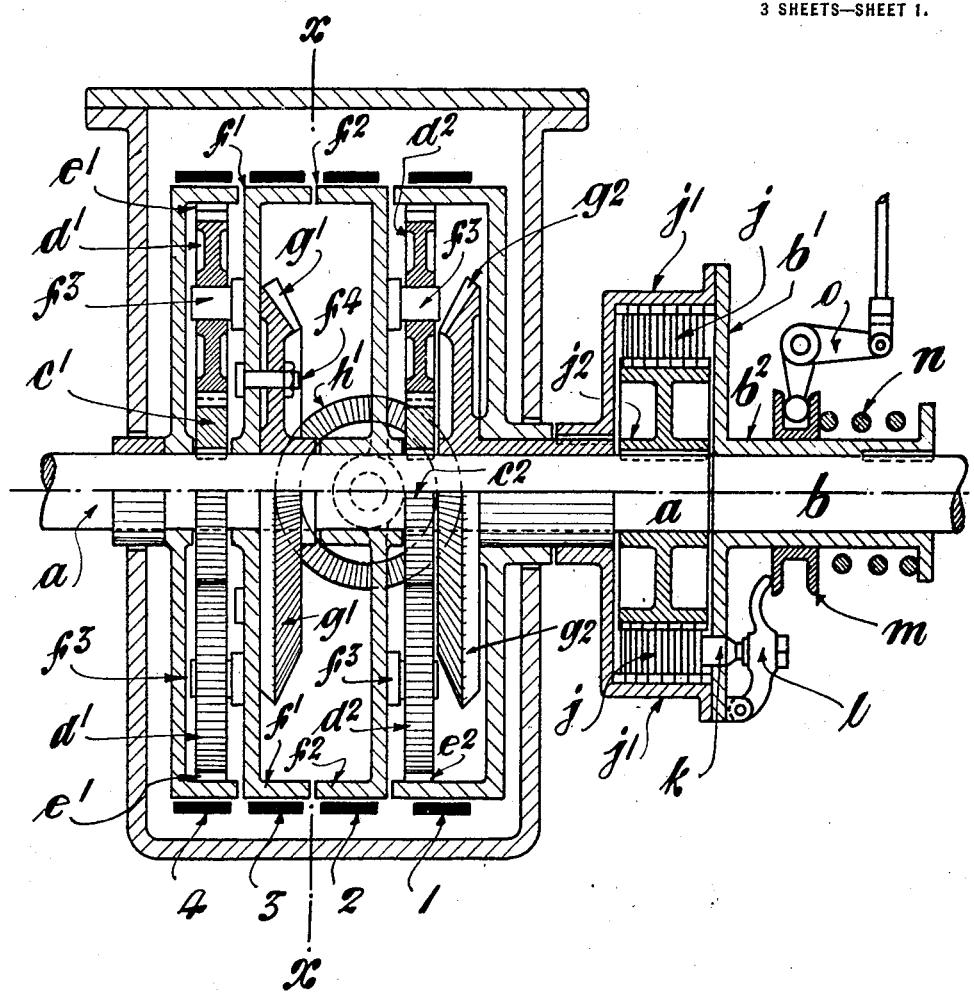

The invention will be further described with reference to the accompanying drawings, wherein, Figure 1 illustrates a longitudinal sectional elevation (in part), and Fig. 2 a cross sectional elevation on line $x$—$x$ of the improved gear.

Figure 3:
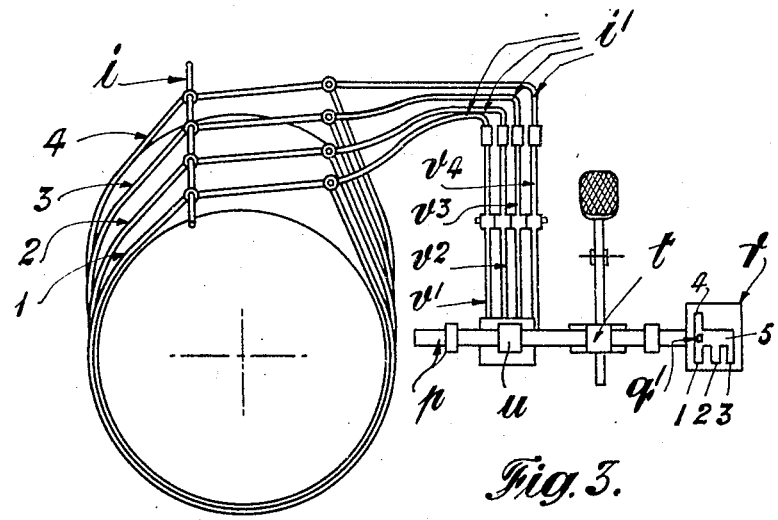
Figures 5, 6:
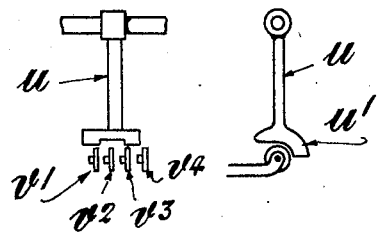
Figure 4:
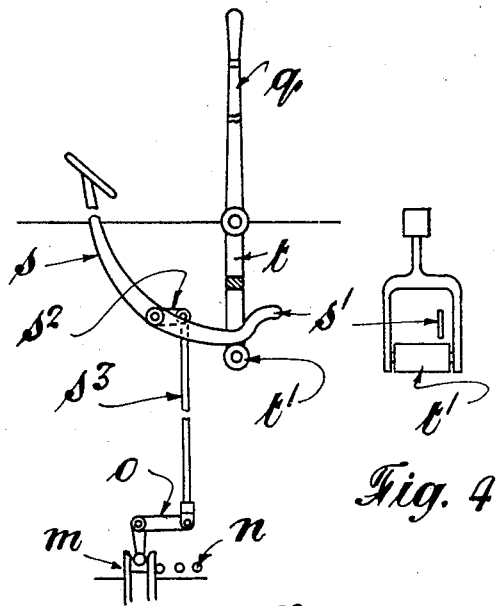

Figs. 3, 4, $4^a$, 5, and 6 illustrate an arrangement of gear-changing devices suitable for use with the improved gear.

Figure 2:
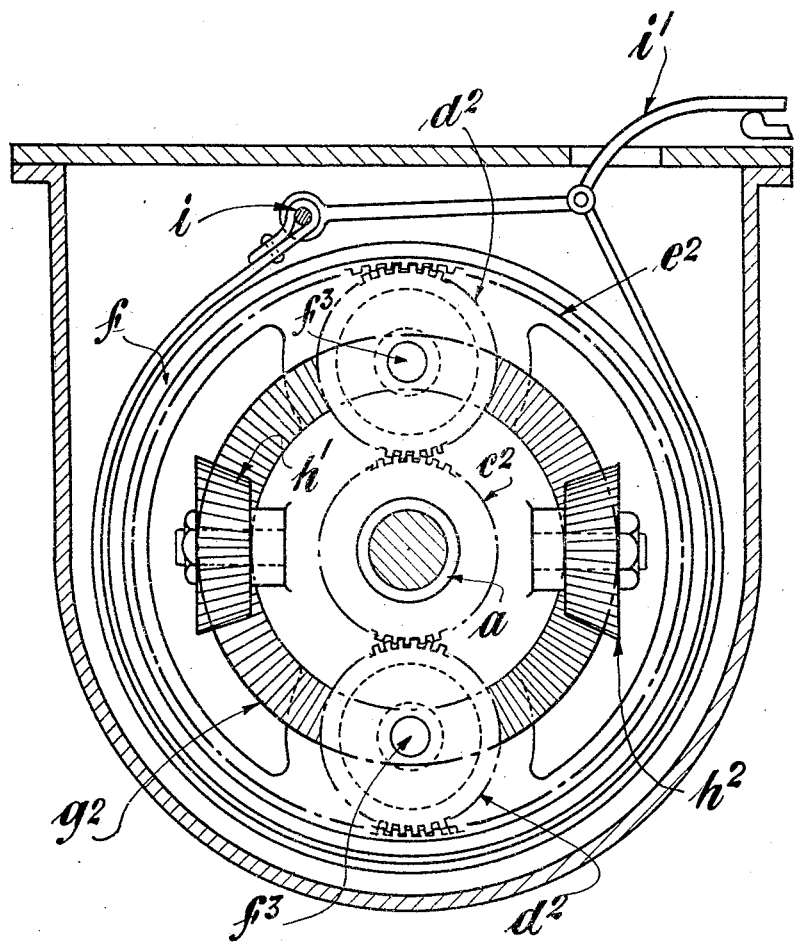

Referring to Figs. 1 and 2, $a$ is the driving shaft and $b$ the final driven or transmission shaft, the two shafts being in line, and their ends abutting as shown. $c^1$, $c^2$ are the sun pinions of the two epicyclic spur wheel gear trains, both keyed to the shaft $a$. $d^1$, $d^2$ are the planet pinions of the said gear trains, and $e^1$, $e^2$ are the internally toothed gear rings of said gear trains. Both gear rings are loose upon their axes. $f^1$, $f^2$ are the planet pinion carriers or cages to which the studs $f^3$ are secured, said studs forming the axes of the planet pinions. The planet cages are both loosely mounted upon the shaft $a$. $g^1$, $g^2$ are the sun wheels of the epicyclic bevel gear train and $h^1$, $h^2$ the planet pinions of said gear train.

The sun bevel wheel $g^1$ is loosely mounted upon the driving shaft $a$ and is secured by bolts and nuts $f^4$ to the planet cage $f^1$. The sun bevel wheel $g^2$ is also loosely mounted upon the shaft $a$, and its hub extends to a point beyond the hub of the gear ring $e^2$, thereby forming a journal or shaft for the gear ring.

As shown in Fig. 2, the planet bevel wheels $h^1$, $h^2$ extend through segmental openings in the planet cage $f^2$ and mesh with the wheels $g^1$, $g^2$.

Each planet cage is formed with an annular flange and the said flanges, together with the gear rings, form brake drums. A brake band is provided for each brake drum, the several bands being marked 1, 2, 3 and 4 respectively. At one end each band is secured (anchored) to a stationary spindle $i$, and at the other end it is connected to a lever fulcrumed upon the said spindle by which it may be caused to grip the brake drum and hold the drum stationary or free the drum.

To the hub part of the sun bevel wheel $g^2$ is keyed the outer part $j^1$ of a plate clutch $j$, the inner part $j^2$ of said clutch being keyed to the driving shaft $a$. The said outer part of the clutch is secured to the flange $b^1$ of a hollow shaft $b^2$. This latter fits and is keyed to the transmission shaft $b$. The plates of the clutch will be controlled (pressed together or released) by any suitable means, the arrangement shown consisting of a plunger $k$ projecting through a hole in the flange $b^1$, a lever $l$ pivotally mounted upon flange $b^1$, and carrying or abutting against said plunger, a sliding collar $m$ and spring $n$ upon the shaft $b$ and a lever $o$, the spring $n$ serving normally to move the collar $m$ in one direction to engage the clutch, and the lever $o$, when operated, serving to move the collar in the opposite direction to free the clutch.

The operations of the improved combined epicyclic spur and bevel gearing are as follows: For the first or lowest speed the transmission shaft $b$ is declutched from the driving shaft $a$ and the gear rings $e^1$, $e^2$ of the first and second spur gear trains are "braked" (held stationary) by their respective brake bands 1, 4; the planet cages $f^1$, $f^2$ are left unbraked (free). This results in the planet pinion studs $f^3$ of both spur gear trains, the sun and planet bevel wheels of the bevel gear train, and the transmission shaft $b$ rotating as one and at a reduced speed, which, for example, may be one fourth of the engine speed. For the second speed, with the transmission shaft $b$ still declutched from the driving shaft $a$, the gear ring $e^1$ of the first spur gear train is unbraked, and the planet cage $f^1$ of such gear train braked, the other planet cage $f^2$ remaining unbraked and the other gear ring $e^2$ remaining braked. This results in the planet pinions $d^1$ of the first spur gear train running idle, and the drive taking place through the second spur gear train and the bevel wheel gear train only, and in the bevel planet wheels $h^1$, $h^2$ increasing the speed of the transmission shaft $b$, which will be double the speed of the first (or lowest) gear speed. For the third or highest speed, both gear rings $e^1$, $e^2$ and both planet cages $f^1$, $f^2$ are unbraked, and the transmission shaft $b$ is clutched to the driving shaft $a$, when the drive takes place directly from the driving to the transmission shaft at engine speed.

For the reverse speed, the transmission shaft $b$ is unclutched from the driving shaft $a$, and the planet cage $f^2$ of the second spur gear train and the gear ring $e^1$ of the first spur gear train are braked, the planet cage $f^1$ of the first spur gear train and the gear ring $e^2$ of the second spur gear train remaining unbraked. This results in the planet cage $f^1$ of the first gear train with the sun bevel wheel $g^1$, the second sun bevel wheel $g^2$ and the transmission shaft $b$ being all rotated at the same speed as the first (or lowest) gear, but with the wheel $g^2$ and shaft $b$ rotating in the reverse direction to the driving shaft.

The gears are constantly in mesh on all speeds, and there is therefore no risk of damaging the gears when changing from one speed to another; further, the motion is transmitted through the same gears for the first and second forward speeds and the reverse speed, and for the high speed the motion is transmitted direct from the driving to the driven shaft, the gears running idle.

The improved gear will usually be inclosed in a box, as shown, which will allow of efficient lubrication, while excluding dust and dirt.

The brake bands will be controlled by suitable gear changing devices. An example of such gear changing devices is shown in Figs. 3 to 6. These devices comprise a shaft $p$, capable of sliding endwise as well as rotating for a portion of a revolution in its bearings. Upon said shaft is keyed a hand lever $q$. Such hand lever at its upper end lies in the slot of a "gate change" plate $r$. Upon the said shaft is also keyed a lever arm $t$ which at its lower end is forked and carries a wide bowl or roller $t^1$.

Upon a further axis or shaft parallel with the shaft $p$ is mounted the foot-lever $s$. Keyed to the foot lever axis, or in one with the foot lever is a cam lever arm $s^1$, which at its free end is cranked or shouldered and rests upon the roller $t^1$, see Fig. 4. Connected to the foot-lever or its axis is also a further lever arm $s^2$, which by means of a rod or link $s^3$ is connected to the lever arm $o$ of the clutch $j$, see Fig. 1. Upon the shaft $p$ is keyed a further lever arm $u$ which at its lower end is formed with cam faces $u^1$, said cam faces over-lying the ends of four levers $v^1$, $v^2$, $v^3$, $v^4$ and in operative relationship to any selected two of said levers. Said levers at their other ends lie immediately under (or are linked to) the free ends of the brake band levers $i^1$ of the improved gear.

The three notches 1, 2, 3 on one side of the gate change plate $r$ represent the two lower speeds and the reverse speed, and the single notch 4 on the other side represents the top or direct speed. The central slot 5 represents "neutral," i. e., gears free and shafts unclutched.

For the first speed, the hand lever $q$ is moved into the notch 2 the angular movement causing the shaft $p$ to rock in its bearings and the cam faces of the lever arm $u$ to depress levers $v^1$ and $v^4$ thereby braking the gear rings $e^1$ and $e^2$.

For the second speed, the hand lever $q$ is moved into the notch 3, thereby first moving shaft $p$ endwise and then in the arc of a circle and causing the cam faces of the lever arm $u$ to depress levers $v^1$, $v^3$, thus braking the planet cage $f^1$ and gear ring $e^2$. For the top speed or direct drive, the hand lever $q$ is moved into the notch 4, thereby unbraking all the braked parts of the gear (if previously braked) and then clutching shaft $b$ direct to shaft $a$. For the reverse speed, the hand lever $q$ is moved into notch 1, whereupon the shaft $p$ is again first moved endwise and then rocked, and the cam faces on lever arm $u$ thereby caused to depress levers $v^2$ and $v^4$, when the gear ring $e^1$ and planet cage $f^2$ are braked.

With each movement of the hand lever $q$ into notches 1, 2 and 3, the lever arm $t$ lifts the cam lever $s^1$ and thereby operates the clutch lever $o$ to declutch the shafts $a$, $b$ and hold them declutched. With the movement of the hand lever $q$ into notch 4, the bolt $t$ allows the free end of the cam lever $s^1$ to fall and the spring $n$ to reëngage the clutch $j$.

With the foot lever $s$ connected to the clutch lever $o$ and independent of the hand lever $q$ it will be seen that the clutch $j$ may also serve as the engine clutch. To facilitate the easy changing of the gears, the foot lever $s$ may be slightly depressed by the foot when operating the hand lever $q$.

Although chiefly applicable to motor road vehicles, the improved gear may be used for other motion-transmitting purposes and wherever the final driven member requires to have its motion varied and reversed (or varied only), and also wherever said member requires to be clutched and declutched to and from the driving member at will.

What I claim is:—

1. Constant mesh change speed gear, comprising two trains of epicyclic spur wheels and a single train of epicyclic bevel wheels, driving and driven shafts upon which said gear trains are operably mounted, and clutch mechanism by which the motion of the driving shaft when the gear trains are inoperative may be transmitted direct to the driven shaft, the planet cage of one of the trains of spur wheels lying between the sun bevel wheels and carrying the planet pinions of the bevel gear train, and the gear ring and planet cage of each train of spur wheels having a brake surface, a brake strap for each of the said brake surfaces, and means for selectively bringing the straps into and out of contact with the brake surfaces, as set forth.

2. Constant mesh change speed gear, comprising a driving shaft and a driven shaft arranged end to end, an epicyclic spur wheel gear train, the sun pinion of which is keyed to the driving shaft, while the planet cage of such gear train is loosely mounted on the driving shaft, said planet cage and the gear ring of the said epicyclic gear train being each formed as a drum, a further epicyclic spur wheel gear train, the sun wheel of which is keyed to the driving shaft, and the planet cage of which is loosely mounted on the driving shaft, said planet cage and the gear ring of the further epicyclic gear train being also each formed as a drum, an epicyclic bevel wheel train, one of the sun wheels of which is secured to the planet cage of the first named spur wheel train, while the other sun wheel of the bevel wheel train, which has an elongated hub part connected to the driven shaft, is loosely mounted on the said driving shaft, the planet pinions of the bevel wheel train being journaled on the planet cage of the second named epicyclic spur wheel train, a clutch between the said driving and driven shafts, means for causing said clutch to connect the driven shaft to the driving shaft, or free the driven shaft from the driving shaft, a brake strap for each of said drums, and means for bringing the straps into and out of contact with their respective drums, substantially as herein set forth.

3. Constant mesh change speed gear, comprising a driving shaft and a driven shaft arranged end to end, two trains of epicyclic spur gear wheels and a single epicyclic bevel gear train arranged side by side on said shafts, the planet pinions of the bevel gear train being journaled on the planet cage of one spur wheel train and one of the sun wheels of the bevel gear train being secured to the planet cage of the other spur wheel gear train, means for holding stationary, or freeing, any one of the planet cages and gear rings, and means for clutching the driving shaft to the driven shaft, the gear ring of the second spur wheel train being permanently connected to the driven shaft, substantially as herein set forth.

In witness whereof I have hereunto set my hand in the presence of two witnesses.

JOHN WARD.

Witnesses:—
    JAMES CROSS,
    JAMES ROBINSON.